United States Patent
Gupta

(10) Patent No.: US 11,164,169 B2
(45) Date of Patent: Nov. 2, 2021

(54) CARD PRE-STAGING AUTOMATED TELLER MACHINE ("ATM") TECHNOLOGY

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 27 days.

(21) Appl. No.: 16/830,558

(22) Filed: Mar. 26, 2020

(65) Prior Publication Data
US 2021/0304164 A1    Sep. 30, 2021

(51) Int. Cl.
| | |
|---|---|
| *G06Q 40/00* | (2012.01) |
| *G06Q 20/10* | (2012.01) |
| *G06K 19/077* | (2006.01) |
| *G06K 19/07* | (2006.01) |
| *G06Q 20/40* | (2012.01) |

(52) U.S. Cl.
CPC ..... *G06Q 20/1085* (2013.01); *G06K 19/0723* (2013.01); *G06K 19/07709* (2013.01); *G06Q 20/4012* (2013.01)

(58) Field of Classification Search
CPC ........ G06Q 20/20; G06Q 20/40; G06Q 20/10; G06Q 20/341; G06Q 20/32; G06Q 20/04; G07F 7/1008; G07F 19/20; G07F 7/08; G07F 7/0866; G07F 7/0886; G07F 7/10
USPC ........ 235/375, 379, 380, 382, 383, 487, 492
See application file for complete search history.

(56) References Cited

U.S. PATENT DOCUMENTS

| | | | |
|---|---|---|---|
| 9,864,944 B2 | 1/2018 | Radu et al. | |
| 2004/0124246 A1* | 7/2004 | Allen | G07F 7/1008 235/492 |
| 2019/0286805 A1 | 9/2019 | Law et al. | |

OTHER PUBLICATIONS

"Are Contactless Cards Safe?" www.thalesgroup.com, Gemalto, Retrieved on Mar. 23, 2020.

* cited by examiner

*Primary Examiner* — Jamara A Franklin
(74) *Attorney, Agent, or Firm* — Weiss & Arons LLP; Michael A. Springs, Esq.

(57) ABSTRACT

Wait times at ATMs may undermine the utility of these self-service machines. ATMs are configured to provide faster self-service kiosks that allow users to quickly perform common financial transactions. However, it has been increasing common for user's to have to wait on line to access an ATM. Apparatus and methods are provided for a smart card that stages transactions by capturing the amount, pin and other necessary information on the smart card itself, before the user begins interacting with the ATM. Information captured by the smart card may be transferred to ATM when the smart card is inserted into ATM. The user does not provide the ATM with any additional information after inserted the smart card into the ATM, thereby improving the transaction processing efficiency of the ATM and enhancing user satisfaction.

10 Claims, 7 Drawing Sheets

CARD PRE-STAGING AUTOMATED TELLER MACHINE ("ATM") TECHNOLOGY

FIELD OF TECHNOLOGY

Aspects of the disclosure relate to improving transaction efficiency and operation of automated teller machines ("ATMs").

BACKGROUND OF THE DISCLOSURE

Wait times at ATMs may detract from the utility of these self-service machines. ATMs are deployed to provide self-service kiosks that allow users to quickly perform common financial transactions. However, it has been increasing common for user's to have to wait on line to access an ATM while other users complete their transactions at the ATM.

An ATM may be capable of processing a higher number of financial transactions per unit of time than a human teller. However, an ATM transaction typically requires numerous inputs from a user before a transaction may be initiated and completed. For example, the ATM may first require a user to insert a card, such as a debit card, into the ATM. The card may include account or other information that links the user to one or more financial accounts. Information stored on the card may include a unique identifier and user name.

Based on the information stored on the card, the ATM may prompt the user to enter a personal identification number ("PIN") associated with the card. The PIN may be used to authenticate the user at the ATM. After authenticating the user, the ATM may then prompt for inputs such as amount of money, an account selection or other transaction details. The prompting for information by the ATM, and the subsequent entry of a response by the user, all increase an amount of time each user may spend at the ATM.

Other users may need to wait on line while a prior user responds to the prompts and completes their desired transaction. The lengthy wait time may increase user dissatisfaction and reduce a transaction efficiency of an ATM.

Some technology solutions exist for reducing the number of ATM prompts and user responses. However, these solutions typically require additional third-party hardware and services, such as a mobile device or laptop/desktop. These solutions, in addition to increasing costs associated with obtaining the third-party hardware and services, increases security risks. For example, a third-party device must be adequately secured to transmit and receive sensitive financial data. Communication channels between the third-party device and the ATM must also be secured. Any financial data stored locally on the third-party device must be adequately secured to prevent unauthorized access to that data.

Accordingly, it would be desirable to reduce user wait-times at an ATM and improve the transaction efficiency of an ATM without relying on third-party hardware or services. It would be further desirable to improve the transaction efficiency of an ATM without incurring the costs to procure and maintain third-party hardware or services. It would also be desirable to improve the transaction efficiency of an ATM without increase the security risks associated with third-party hardware and services.

Accordingly, it is desirable to provide apparatus and methods for CARD PRE-STAGING ATM TECHNOLOGY.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
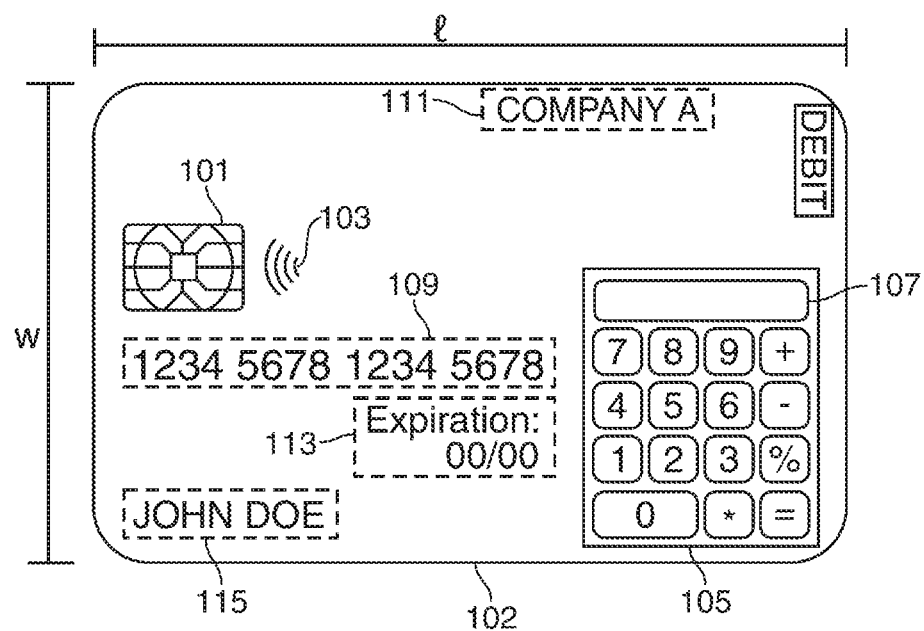
FIG. 1 shows illustrative apparatus in accordance with principles of the disclosure.
Figure 1:
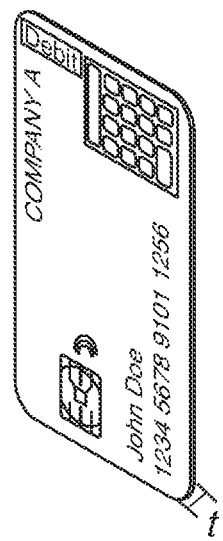

Apparatus for a smart card are provided. Apparatus may increase transaction processing efficiency of an Automated Teller Machine ("ATM").

The smart card may include a microprocessor. The smart card may include various other components, such as a battery, a speaker, and antennas. The microprocessor may have a thickness that is not greater than 0.25 millimeters ("mm"). The microprocessor may control overall operation of the smart card and its associated components. The smart card may include RAM, ROM, an input/output ("I/O") module and a non-transitory or non-volatile memory.

The I/O module may include a microphone which may accept user provided input. The I/O module may include one or more of a speaker for providing audio output and a display for providing textual, audiovisual and/or graphical output.

Software may be stored within the non-transitory memory and/or other storage media. The software may provide instructions to the microprocessor for enabling the smart card to perform various functions. For example, the non-transitory memory may store software used by the smart card, such as an operating system, application programs, web browser and a database. Alternatively, some or all of computer executable instructions of the smart card may be embodied in hardware or firmware components of the smart card.

Application programs, which may be used by the smart card, may include computer executable instructions for invoking user functionality related to communication, authentication services, and voice input and speech recognition applications. Application programs may utilize one or more algorithms that encrypt information, process received executable instructions, interact with an ATM, perform power management routines or other suitable tasks.

The smart card may include a pressure sensitive button. The pressure sensitive button may have a thickness that is not greater than 0.8 mm. The pressure sensitive button may be actuated by a user to activate the smart card. For example, actuating the pressure sensitive button may activate the microprocessor, keypad or ATM interface of the smart card.

In some embodiments, the smart card may be activated in response to receiving high frequency wireless signals. The high frequency signals may be detected by the ATM interface. The high frequency signals may be broadcast by an ATM. The high frequency signals may be generated by a near field communication ("NFC") reader. The high frequency signals may provide power to one or more components of the smart card. In some embodiments, in response to receiving the power, the microprocessor may be activated and begin to draw power from a battery on the smart card.

The smart card may operate in a networked environment. The smart card may support establishing communication channels with one or more ATMs. The smart card may connect to a local area network ("LAN"), a wide area network ("WAN") or any suitable network. When used in a LAN networking environment, the smart card may be connected to the LAN through a network interface or adapter. The ATM interface may include the network interface or adapter.

When used in a WAN networking environment, the smart card may include a modem or other means for establishing communications over a WAN, such as the Internet. The ATM interface may include the modem. It will be appreciated that the network connections shown are illustrative and other means of establishing a communications link between devices may be used. The existence of any of various well-known protocols such as TCP/IP, Ethernet, FTP, HTTP and the like is presumed.

The smart card may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The smart card may utilize computer-executable instructions, such as program modules, being executed by a computer. Generally, program modules include routines, programs, objects, components, data structures, etc. that perform particular tasks or implement particular abstract data types. The smart card may be operational with distributed computing environments where tasks are performed by remote processing devices that are linked through a communications network. In a distributed computing environment, program modules may be located in both local and remote computer storage media including memory storage devices.

The smart card may include one or more batteries. A battery of the smart card may be flexible. The battery may be a power source for electronic components of the smart card. For example, the battery may supply power to a keypad, the ATM interface and the microprocessor. The battery may have a thickness that is not greater than 0.5 mm.

The battery may be recharged via an electrical contact when the smart card is in contact with the ATM. The smart card's power source may include high frequency signals received from an ATM or other network node. The smart card may be configured to utilize received high frequency signals to recharge the battery or provide power to other components of the smart card.

The smart card may include an electrical contact. An electrical contact may be constructed using any suitable material that conducts or transfers electricity. The smart card may include a plurality of electrical contacts. An electrical contact may be accessible on any suitable face of a housing of the smart card. The contact may be accessible through a thickness of the housing. The contact may be utilized to transfer electrical charge to the rechargeable battery when the smart card is inserted into an ATM card reader.

The smart card may include an ATM interface. The ATM interface may have a thickness that is not greater than 0.8 mm. The ATM interface may include a circuitry for establishing communication with an ATM. The ATM interface may be configured to implement protocols for wireless communication. The ATM interface may include a wireless circuit.

The wireless circuit may include software and/or hardware for establishing a wireless communication channel with the ATM. Such protocol may include Wi-Fi, Bluetooth, Ethernet, NFC and cellular telecommunications. Wi-Fi may include passive Wi-Fi with lower power consumption than typical Wi-Fi. The smart card may be configured to communicate using a typical Wi-Fi range such as 150-300 ft. when searching for available ATM wireless communication channel.

An ATM interface of the smart card may include a Near Field Communication ("NFC") chip. The NFC chip may communicate over a typical NFC range (~2 in.) when transmitting or receiving sensitive data. An illustrative NFC chip may utilize a 13.56 MHz radio frequency. A microprocessor or the smart card may be configured to dynamically limit or expand transmitting and receiving ranges. The microprocessor may dynamically limit or expand transmitting and receiving ranges in response to detected location of the smart card.

For example, the microprocessor may expand a communication range when the smart card is within a "familiar" zone. Expanding a communication range may include using a Wi-Fi communication channel rather than a NFC communication channel. A familiar zone may be a pre-defined radius of a user's home or work location. The microprocessor may limit a communication range when the smart card is within an "unknown" zone. For example, the microprocessor may limit a communication range when the user is travelling. The microprocessor may restrict the smart card to using NFC or contact-based communication channels when in an unknown zone.

In some embodiments, the smart card may be activated in response to receiving wireless signals from the ATM. The wireless signals may provide power to one or more components of the smart card. Illustrative wireless signals may include NFC signals. For example, in response to receiving power via the wireless signals, a microprocessor of the smart card may be activated.

The smart card may include a battery for powering the ATM interface and the microprocessor. The smart card may include an electrical contact that may be used to establish a wired or contact based connection to the ATM. For example, the smart card may include an "EMV" chip.

EMV is a technology that derives its name from the companies (Europay, MasterCard, and Visa) that helped develop the technology. When an EMV chip is inserted into a specialized card reader, the reader powers the EMV chip and the EMV chip generates a new authorization code each time it is used to authorize a transaction. Thus, simply copying information printed on the face of the smart card or encoded on a magnetic stripe may be insufficient to initiate a fraudulent transaction.

The EMV chip may function as an electrical contact. The EMV chip may include software and/or hardware for establishing a wired communication channel with the ATM. The battery of the smart card may be recharged via the at least one electrical contact when the smart card is in contact with the ATM via the EMV chip.

The smart card may include a housing. The housing may provide a protective layer for internal components of the smart card. The housing may be flexible. The housing may be constructed from plastic or other suitable materials. The housing may define a form factor of the smart card.

For example, an ATM may include a card reader constructed to receive a card that conforms to a predefined form factor. As illustrative form factor is defined in specifications published by the International Organization for Standardization. Illustrative specifications may include: ISO/IEC 7810, ISO/IEC 7811 and ISO/IEC 7816, which are hereby incorporated herein by reference in their respective entireties.

The smart card may include a keypad. The keypad may include mechanical keys. The keypad may be mounted on an outside of the housing. The housing of the smart card may conform to the predefined form factor. For example, the housing and the keypad mounted on an outside of the housing may collectively have a thickness that is not greater than 0.8 mm and a surface area that is not greater than 86 mm×54 mm.

The ATM may utilize information stored on the card to authenticate a user at the ATM. In addition to information stored on the card, the ATM may prompt the use for additional information before allowing the user to initiate a transaction at the ATM. The additional information may include a PIN or biometric feature.

After authenticating the user, the ATM may allow the user to initiate a transaction at the ATM. Illustrative transactions may include withdrawing cash, transferring funds between accounts or depositing cash/checks.

The smart card may include a microprocessor. The microprocessor may be embedded in and protected by the housing.

The smart card may include non-transitory memory locations within the housing. The microprocessor may access such memory locations. The non-transitory memory may be included in the microprocessor.

The non-transitory memory locations may store instructions, that when executed by the microprocessor, cause the smart card to perform various functions. For example, the microprocessor may instruct the ATM interface to scan for a wired or wireless communication channels and connect to a detected ATM.

The smart card may include a keypad. The keypad may be mounted on an outside of the housing. The keypad may include mechanical keys. The keypad may not increase the form factor of the smart card defined by the ATM for receiving the smart card. A user of the smart card may enter data using the keypad. The data entered by the user may be captured by the microprocessor. The user may enter data via the keypad that would typically be requested by the ATM when authenticating the user. The user may enter data via the keypad that would typically be requested by the ATM to initiate a transaction on behalf of the user.

The keypad may allow the user to enter data that will be needed by the ATM before accessing the ATM. Entering the data beforehand may reduce an amount of time the user spends entering data after accessing the ATM. Reducing the amount of time the user spends entering data at the ATM may reduce the amount of time other users spend waiting for access to the ATM. Reducing the amount of time the user spends entering data at the ATM may increase the number of transaction that the ATM may process per unit of time. Thus, reducing the amount of time the user spends entering data at the ATM may increase the transaction processing efficiency of the ATM.

Data entered using the keypad may include authentication information that would typically be requested by an ATM before providing a user access to one or more services of the ATM. For example, the user may enter a PIN or biometric feature. The authentication information may be encrypted and stored on the smart card. After capturing the authentication information, the smart card may present the authentication information to the ATM without requiring any further input from the user.

Data entered using the keypad may include transaction information that would typically be requested by an ATM before implementing one or more services of the ATM. For example, the user may enter a cash withdrawal amount using the keypad before reaching the ATM. The smart card may present the withdrawal amount to the ATM without requiring any further input from the user. The smart card may instruct the ATM to execute the withdrawal transaction without requiring any further input from the user.

Other illustrative data that may be entered via the keypad may include a user's name, an expiration date of the smart card, an amount, a currency, a card verification value ("CVV") or any other suitable data. The user may enter information such as a telephone number, address or zip code. Such information may be used to authenticate the user.

In some embodiments, data entered using the keypad may be transferred to ATM when the smart card is inserted into or otherwise in communication with the ATM. In some embodiments, data entered using the keypad may be transferred to the ATM before the user inserts the smart card into the ATM. The information transferred to the ATM may be utilized by the ATM to complete transaction details that would have otherwise required prompting the user for inputs at the ATM. Capturing the data on the smart card before the user accesses the ATM reduces the amount of time a user needs to spend entering data at the ATM, thereby increasing the transaction processing efficiency of the ATM.

The smart card may include executable instructions. The executable instructions may be stored in a non-transitory memory. The executable instructions, when run by the microprocessor, may implement various functions of the smart card. The instructions may capture data entered using the keypad. The executable instructions may encrypt the captured data. The smart card may include a dedicated encryption controller for performing the encryption. The executable instructions may store the encrypted data locally on the smart card.

The executable instructions may formulate a set of instructions executable by the ATM. The set of instructions executable by the ATM may be formulated based on the data (e.g., transaction information) captured by the keypad. For example, the microprocessor may formulate instructions for executing a transaction at the ATM. The microprocessor of the smart card may integrate the data captured from the keypad into the set of transaction instructions that are executable by the ATM.

The smart card may transfer the set of instructions to the ATM. The smart card may transfer the set of instructions in response to establishing a communication channel with the ATM. The ATM interface may be used to establish the communication channel. For example, the smart card may establish the communication channel when the smart card is inserted into a card reader of the ATM. The ATM may autonomously initiate a transaction based on the transaction information or set of transaction instructions store on the smart card, thereby improving the transaction processing efficiency of the ATM.

For example, using the keypad, the smart card may capture a PIN and withdrawal amount from a user. The smart card may formulate a withdrawal request for the amount entered by the user. The smart card may formulate the withdrawal request before the user inserts the smart card into the ATM.

The smart card may include an ATM interface that includes a wireless ATM interface. The smart card may scan for a wireless communication channel broadcast by the ATM. The smart card may attempt to establish a connection to the ATM using the detected wireless communication channel. The smart card may establish the wireless communication channel to the ATM before the smart card is inserted into the ATM.

The wireless communication channel may only be used for transferring a set of transaction instructions previously formulated by the smart card. In response to receiving the set of transaction instructions, the ATM may initiate pre-processing of the user's desired transaction.

Pre-processing may include verifying any authentication information included in the set of transaction instructions. Pre-processing may include verifying that the user has sufficient funds available to warrant dispensing cash to the user. The pre-processing may determine that further input is needed from the user before dispensing cash.

For example, a user's account or ATM location may be associated with a specific fraud-mitigating protocol. The fraud-mitigating protocol may require a user to provide additional authentication information or verify previously provided authentication information before the ATM executes a transaction stored on the smart card.

The ATM may complete any pre-processing of the transaction before the user approaches the ATM and inserts the smart card into the ATM. The ATM, in response to detecting that the smart card has been inserted into the ATM, may determine that it has pre-processed the set of transaction instructions. The ATM may then execute the transaction implemented by the set of transaction instructions.

From a perspective of the user, the transaction may be executed in real time after the smart card is inserted into the ATM. For example, if the set of transaction instructions correspond to a withdrawal request, in response to inserting the smart card into the ATM, the ATM may provide the requested cash to the user.

In some embodiments, the set of transaction instructions formulated by the microprocessor and stored locally on the smart card may not be transferred to the ATM before the smart card is inserted into the ATM. Such embodiments may provide an additional layer of fraud-mitigation by reducing the possibility that the set of transaction instructions will be intercepted during wireless transmission to the ATM.

The set of transaction instructions may be transferred to the ATM using a contact-based communication channel, such as an EMV chip. When the set of transaction instructions are received by the ATM, the ATM may verify the authentication information and execute the requested transaction.

In some embodiments, the smart card may capture authentication information. The smart card may encrypt the authentication information and transfer the authentication information to the ATM. The ATM may therefore not prompt the user for authentication information after the smart card is inserted into the ATM.

After the user inserts the smart card into the ATM, the smart card may interact directly with the ATM, without requiring any further authentication information from the user. The smart card may transfer the authentication information to the ATM in response to an authentication request submitted by the ATM directly to the smart card.

After the ATM authenticates the user and the inserted smart card, the smart card may then transfer the set of transaction instructions to the ATM. The set of transaction instructions may be formatted in a fashion that is understandable for processing by the ATM. The ATM may autonomously decrypt the set of transaction instructions.

The ATM may autonomously execute the set of transaction instructions and initiate a withdrawal transaction based on the withdrawal amount previously entered by the user. The set of transaction instructions formulated by the microprocessor may be sufficient to execute the transaction without the ATM prompting for additional data. The ATM may provide the request amount of cash to the user without requiring the user to enter any information at the ATM after inserting the smart card into the ATM.

The smart card may encrypt selected data entered by the user. The ATM may decrypt data it receives from the smart card. The selected data may be less than all of the data associated with a set of transaction instructions. For example, the smart card may only encrypt a PIN or other authentication information. The smart card may encrypt any data entered by the user via the keypad.

Limiting the amount of data that is encrypted by the smart card may allow the smart card to use less power to function. Using less power may improve the functionality of the smart card by extending its battery life and extending the amount of time between charging.

Limiting the amount of data that is encrypted may improve functionality of the ATM. The ATM may only need to decrypt selected data and not an entire set of transaction instructions. This may speed up a response time of the ATM when processing transactions instructions received from eh smart card. Limiting the amount of data that needs to be decrypted by the ATM may further increase the transaction processing efficiency of the ATM per unit of time.

The executable instructions may be configured to delete the encrypted data from the smart card after expiration of a pre-determined time period. The executable instructions may be configured to delete the set of transaction instructions from the smart card after expiration of a pre-determined time period.

The keypad of the smart card may have an inactive state. In the inactive state, the keypad may not capture data entered using the keypad. For example, in the inactive state, the microprocessor may not supply power to the keypad. In the inactive state, the microprocessor and associated executable instructions may not capture data entered using the keypad.

The keypad may have an active state. In the active state, the keypad may be capable of capturing data entered by a user. In the active state, the microprocessor may supply power to the keypad. In the active state, the microprocessor and associated executable instructions may capture and/or encrypt data entered by the user using the keypad.

The inactive state of the keypad may be a default state. When the keypad is in the inactive state, data entered using the keypad of the smart card is not captured by the microprocessor. The microprocessor may toggle the keypad between the inactive and active states. For example, the microprocessor may activate the keypad in response to establishing a communication channel with an ATM.

A system for increasing transaction processing efficiency of an Automated Teller Machine ("ATM") is provided. The system may include a smart card having a thickness not greater than 0.8 mm. The smart card may have a width not greater than 54 mm. The smart card may have a length not greater 86 mm.

The system may include an ATM interface. The ATM interface may be embedded in the smart card. The ATM interface may include hardware and software for communicating with an ATM. For example, the smart card may include circuitry for communicating over Wi-Fi, NFC, Bluetooth, cellular or any suitable wireless network or protocol. The ATM interface may include a wired communication interface. For example, the smart card may include circuitry and externally accessible electrical contact(s) for communicating over a wired Ethernet or any suitable wired network or protocol.

The system may include a microprocessor. The microprocessor may be embedded in the smart card. The microprocessor may control communication conducting using the ATM interface. For example, the microprocessor may initiate communication with an ATM using the ATM interface. The microprocessor may terminate communication with the ATM by turning off the ATM interface. Turning off the ATM interface may include disconnecting from the ATM. Turning off the ATM interface may include terminating an ongoing communication session with the ATM. Turning off the ATM interface may include cutting off power supplied to the ATM interface.

The system may include a user input system. The user input system may be in electronic communication with the microprocessor. The user input system may include a keypad. The user input system may include an input controller. The input controller may capture data entered using the keypad. The user input system may include a voice controller. The voice controller may capture voice commands. The voice controller may generate an audio message confirming data captured by the input controller. The user input system may include an encryption controller. The encryption controller may encrypt data captured by the input controller and/or the voice controller.

The system may include machine executable instructions. The executable instructions may be stored in a non-transitory memory on the smart card. In some embodiments, the executable instructions may be stored in a non-transitory memory on the ATM. The executable instructions may be transferred to the smart card using a communication channel established using the ATM interface of the smart card.

The executable instructions, when run by the microprocessor, may self-authenticate a user or the smart card. The self-authentication may be conducted over a communication channel established using the ATM interface. The communication channel may be a secure communication linking the smart card and the ATM.

The executable instructions, when run by the microprocessor on the smart card may formulate transaction instructions executable by the ATM. The transaction instructions may be formulated based on the encrypted data. The transaction instructions may be transferred to the ATM over the securing communication channel linking the smart card and the ATM.

The transaction instructions may be formulated before a secure communication channel is established between the smart card and the ATM. For example, a user of the smart card may enter data using the keypad when the user is at home. While at home, the smart card may not be within a communication range of an ATM.

An ATM may only establish a secure communication link with the smart card when the smart card is within a threshold distance of the ATM. When the smart card is within the threshold distance, the smart card may be likely or expected to access the ATM. In some embodiments, the secure communication link may only be established when the smart card initiates a request to establish the secure communication link.

Transaction information or instructions stored locally on the smart card may be used to stage a transaction at the ATM. A staged transaction may include all data needed to execute a transaction at the ATM without requiring further input from a user. For example for a withdrawal transaction, the transaction instructions may include a PIN, the amount to be withdrawn and the account funds are to be withdrawn from. When the ATM receives the transaction information/instructions, the ATM may verify that the PIN is associated with the account. The ATM may also verify that the account includes sufficient funds to fulfill the withdrawal request.

After conducting the verification, the ATM may execute the transaction information/instructions. Thus, the user of the smart card may not need to input any additional information after the transaction information/instructions are transferred to the ATM.

In some embodiments, after conducting the verification of the PIN and sufficient funds, the ATM may await an instruction from the user before executing the transaction. For example, the ATM may receive the transaction instructions over a wireless communication channel. The ATM may receive the transaction instructions over the wireless communication when the smart card is outside a threshold distance from the ATM.

For example, user of the smart card may enter data used to formulate the transaction instructions when the user is at home or at work. The transaction instructions may be transmitted to the ATM over a Wi-Fi or cellular communication channel.

Transaction information/instructions may be transmitted from the smart card to a target ATM. The transaction information/instructions may be transmitted to a cloud computer system. When the smart card establishes a wired connection to the ATM, the ATM may check whether a staged transaction associated with the smart card is stored in the cloud computing system.

In some embodiments, after storing transaction information/instructions locally on the smart card, a flag may be set on the smart card. The ATM may be configured to check the flag and determine whether transaction information/instructions for a staged transaction have been generated by the smart card.

In some embodiments, the ATM may require authentication before establishing a wired connection with the smart card. For example, the ATM may require entry of the PIN or submission of a biometric feature before executing a staged transaction.

Executing a staged transaction may reduce the number of user inputs required at the ATM. Reducing the number of user inputs at the ATM improves the transaction processing efficiency of the ATM.

The executable instructions, when run by the microprocessor may configure the smart card to purge the staged transaction when an ATM does not establish a wired or contact-based communication channel with the smart card within a pre-determined time period.

A cloud computing system may receive transaction information/instructions at a first time. When an ATM accessible to the cloud computing system does not establish a wired connection to the smart card by a second time, the cloud computing system may purge the transaction information/instructions. In some embodiments, the interval between the first and second times may be set by the cloud computing system. The cloud computing system may assign a default interval to transaction information/instructions received from the smart card.

The cloud computing interval may assign a longer or shorter time interval based on a distance between a location of the smart card transmitting the transaction information/instructions and a location of an ATM. The system may use a machine leaning algorithm to determine an interval that provides sufficient time for the smart card user to travel to the ATM.

The machine learning algorithm may take account of traffic patterns, time of day and typical user behavior. For example, if transaction information/instructions are received closer to the end of a work day, the interval may be shorter than if the transactions instructions are received earlier in the work day.

The system may include a front controller. The front controller may be included in the ATM. Using an ATM communication channel, the front controller may receive encrypted input data from the smart card via the ATM interface. The encrypted data may include transaction information/instructions. The transaction information/instructions may be received by the front controller from a cloud computing system.

The system may include a decryption controller. The decryption controller may be included in the ATM. The decryption controller may decrypt encrypted data received by the ATM from the smart card.

The system may include an input validation controller. The input validation controller may communicate with a remote computer server. The remote computer serer may be a cloud computing system. The remote computer server may validate the encrypted data received from the smart card. Validating the encrypted data may include verifying whether transaction information/instructions received from the smart card are associated with a valid PIN or other valid authentication information. Validating the encrypted data may include verifying whether transaction information/instructions are associated with sufficient funds for a specified account.

The system may include a payment dispatcher. The payment dispatcher may be included in the ATM. The payment dispatcher may dispense cash or other items in response to a positive validation received from the input validation controller.

The smart card may include a wireless ATM interface. The executable instructions stored in a non-transitory memory may scan for a wireless ATM communication channel. An ATM wireless communication channel may only be detectable when the smart card is within a threshold distance of an ATM. For example, the ATM wireless communication channel may be purposefully configured to have a maximum transmission range that is limited to a threshold distance from the ATM.

In response to detecting the wireless ATM communication channel, the smart card may transfer the encrypted data to the ATM over the wireless ATM communication channel. The ATM may pre-stage a transaction based on transaction information/instructions included in the received encrypted data. The ATM may execute the pre-staged transaction only after establishing contact-based communication with the smart card.

The executable instructions stored on the smart card may purge encrypted data stored on the smart card when contact-based communication with the ATM is not established within a pre-determined time period. The ATM may purge transaction instructions received from the smart card when contact-based communication is not established with the smart card within a pre-determined time period.

Methods for improving transaction processing efficiency of an Automated Teller Machine ("ATM") are provided. Methods may include capturing transaction information using a keypad embedded in a smart card. Methods may include formulating transaction instructions based on the transaction information captured via the keypad.

Methods may include encrypting the transaction information. Methods may include storing the encrypted transaction information locally on the smart card. Methods may include encrypting the transaction instructions. Methods may include storing the encrypted transaction instructions locally on the smart card.

Methods may include transferring the encrypted transaction instructions from the smart card to an ATM. Methods may include formulating a staged transaction at the ATM based on the encrypted transaction information. The staged transaction may include information needed for the ATM to execute a transaction autonomously, without requiring additional user input. Methods may include executing the staged transaction without receiving any input from a user of the smart card after transferring the encrypted transaction instructions from the smart card to the ATM.

In some embodiments, the smart card may encrypt transaction information entered by a user. Methods may include providing audio confirmation to the user of the smart card. The audio confirmation may provide an audible articulation of the encrypted transaction information/instructions stored locally on the smart card.

Methods may include transferring the encrypted transaction information/instructions from the smart card to the ATM using a contact-based communication channel. Methods may include transferring the encrypted transaction information/instructions from the smart card to the ATM using a wireless communication channel. The smart card may transmit the encrypted transaction information to the ATM. The ATM may formulate the transaction instructions based on the encrypted transaction information.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative smart card 100. Smart card 100 includes keypad 105. Keypad 105 may be used by a user of smart card 100 to enter information. Exemplary information may include an amount of cash the user wishes to withdraw from an ATM. The information may include a time or a time window when the user would like to withdraw the cash from the ATM.

For example, using keypad 105, the user may enter "100." This information may represent an amount of funds (e.g., $100) the user wishes to withdraw from an ATM. A currency of the funds may be automatically assigned based on a location of the ATM. In some embodiments, keypad 105 may include denomination keys for specifying the denomination of the funds. Illustrative denominations may include appropriate symbols for dollars ($), euros (€), yen (¥), pounds (£) or any suitable currency.

The user may also enter "1530." This information may represent that the user wishes to withdraw the $100 after 2:30 pm. When the user specifies a time, the ATM may not allow withdrawal of the $100 before 2:30 pm. In some embodiments, the user may not specify any time. Not specifying any time may indicate that the user wishes to be able to withdrawn the funds at any time.

In some embodiments, the user may enter a time window. For example, the user may enter "1530-1430." This may indicate that the user only authorizes staged withdrawal of the $100 during between 2:30 pm and 4:30 μm. The ATM may not allow withdrawal of $100 before 2:30 μm. The ATM may not allow execution of the staged withdrawal of $100 after 4:30 pm. For example, smart card 100 may purge the information associated with the staged transaction after 4:30 pm. Smart card 100 may not push the information to an ATM before 2:30 pm or after 4:30 pm. Smart card 100 may also purge the staged transaction after it has been transferred to an ATM.

Smart card 100 includes a microprocessor and other components for capturing, encrypting and storing the information entered by a user. Smart card 100 may also include executable instructions for packaging transaction information entered via keypad 105 into staged transaction instructions that may be executed by an ATM.

FIG. 1 shows that smart card 100 also include chip 101. Chip 101 may provide an electrical contact that is accessible through housing 102. Chip 101 may provide an electrical contact for establishing a wired or contact based communication channel with an ATM when card 100 is inserted into a card reader of the ATM. Chip 101 may be an EMV chip.

Chip 101 may store a copy of information printed on a face of smart card 100. For example, chip 101 may store card number 109, user name 115, expiration date 113 and issuing bank 111. Chip 101 may also store encrypted security information. The encrypted security information may be utilized to provide a "second factor" method of authentication prior to executing a staged transaction.

For example, smart card 100 may package information entered by user 115 via keypad 105 into staged transaction instructions. The staged transaction instructions may include a PIN associated with smart card 100. The staged transaction instructions may be executable by an ATM without requiring any further input from user 115. The staged transaction instructions may be transferred to the ATM using wireless circuitry 103. In some embodiments, the staged transaction instructions may be transferred via chip 101.

After an ATM receives staged transaction instructions, the ATM may first determine whether the PIN included in the staged transaction instructions is associated with smart card 100. For example, the ATM may communicate with a remote server and determine whether the received PIN is associated with user name 115 and/or card number 109.

As a second factor method of authentication, the ATM may determine whether the PIN included in the staged transaction instructions (and transferred to the ATM) successfully unlocks encrypted security information stored on chip 101. In the PIN successfully unlocks the encrypted security information, the ATM may execute the staged transaction instructions.

FIG. 1 also shows that smart card 100 has width w and length l. Smart card 100 may be any suitable size. For example, width w may be 53.98 millimeters ("mm"). Length l may be 85.60 mm. Smart card 100 has a thickness t. An illustrative thickness may be 0.8 mm. An exemplary form factor of smart card 100 may be 53.98 mm×85.60 mm×0.8 mm. This exemplary form factor may allow smart card 100 to fit into a user's wallet or pocket. This exemplary form factor may allow smart card 100 to fit into a card reader of an ATM.

Figure 2:
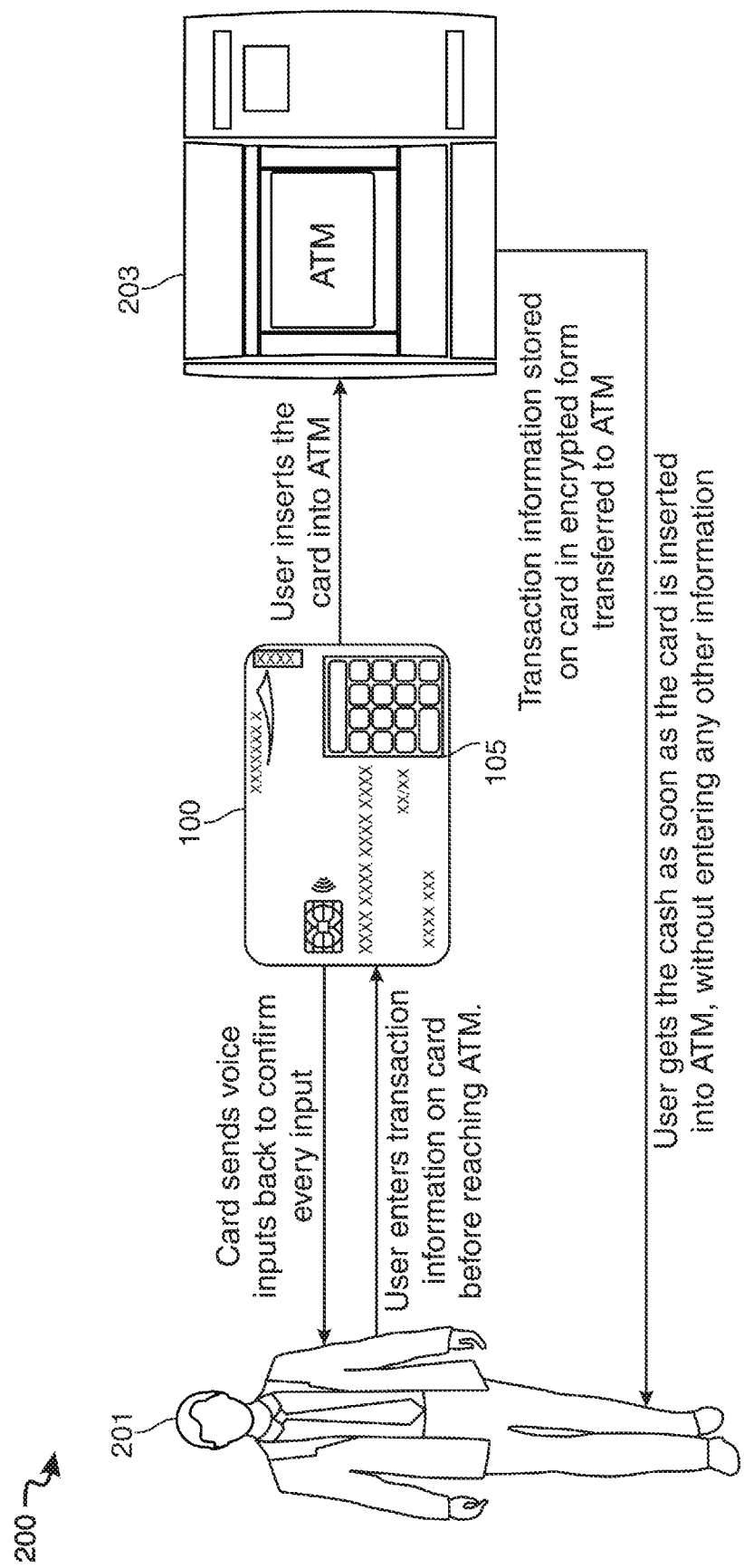
FIG. 2 shows an illustrative apparatus and scenario in accordance with principles of the disclosure.

FIG. 2 shows illustrative scenario 200. In scenario 200, user 201 may enter a withdrawal amount and PIN using keypad 105 of smart card 100. The information entered by user 201 may be encrypted and stored locally on smart card 100. Smart card 100 may include a speaker (not shown). The speaker may provide user 201 with audio confirmation of transaction information entered using keypad 105. For example, the speaker may provide audio confirmation of the amount. In some embodiments, to maintain secrecy of a PIN, the speaker may not provide audio confirmation of the PIN.

After entering the amount, PIN, account and any other necessary information (collectively, "transaction information"), the transaction information is encrypted and stored locally on smart card 100. Smart card 100 may include a specially designed memory location for securely storing transaction information.

In some embodiments, transaction information stored locally on smart card 100 may be transferred to ATM 203. ATM 203 may formulate transaction instructions based on the transaction information received from smart card 100. In some embodiments, a microprocessor on smart card 100 may be configured to formulate the transaction instructions executable by ATM 203 based on the transaction information. No external hardware or software such as a mobile device, laptop or desktop devices is needed to formulate the transaction instructions. The transaction instructions may also be encrypted and securely stored locally on smart card 100.

The microprocessor of smart card 100 may also purge any locally stored transaction information or instructions that have not been transferred to ATM 203 within a predetermined time window. Transaction information or instructions may be transferred to ATM 203 when smart card 100 is inserted into a card reader (not shown) of ATM 203.

Transaction information or instructions may be transferred to ATM 203 when smart card 100 is within a target distance of ATM 203. Smart card 100 may include circuitry for conducting NFC communication. The target distance may correspond to being within range for conducting NFC communication. A typical NFC range is ~2 in.

In other embodiments, the microprocessor of smart card 100 may be configured to dynamically limit or expand wireless transmitting and receiving ranges. The microprocessor may dynamically limit or expand wireless transmitting and receiving ranges in response to detected location of smart card 100.

Smart card 100 may include a global positioning system ("GPS") chip for receiving and/or transmitting GPS signals. The microprocessor of smart card 100 may determine a current location of the smart card based on the received GPS signals. In other embodiments, the microprocessor of smart card 100 may determine a current location of the smart card based on signal triangulation or information received from an ATM.

After transaction information or instructions stored locally on smart card 100 are transferred to ATM 203, ATM 203 executes the transaction based on the received transaction information or instructions. FIG. 2 shows that for a withdrawal transaction, ATM 203 provides user 201 with the requested amount of cash when smart card 100 is inserted or otherwise establishes communication with ATM 203. User 201 will not have to input any information into ATM 203, or use the screen or keyboard of ATM 203. The process and apparatus shown in FIG. 2 will increase transaction efficiency of ATM 203 by allowing ATM 203 to process more transactions per unit of time.

Figure 3:
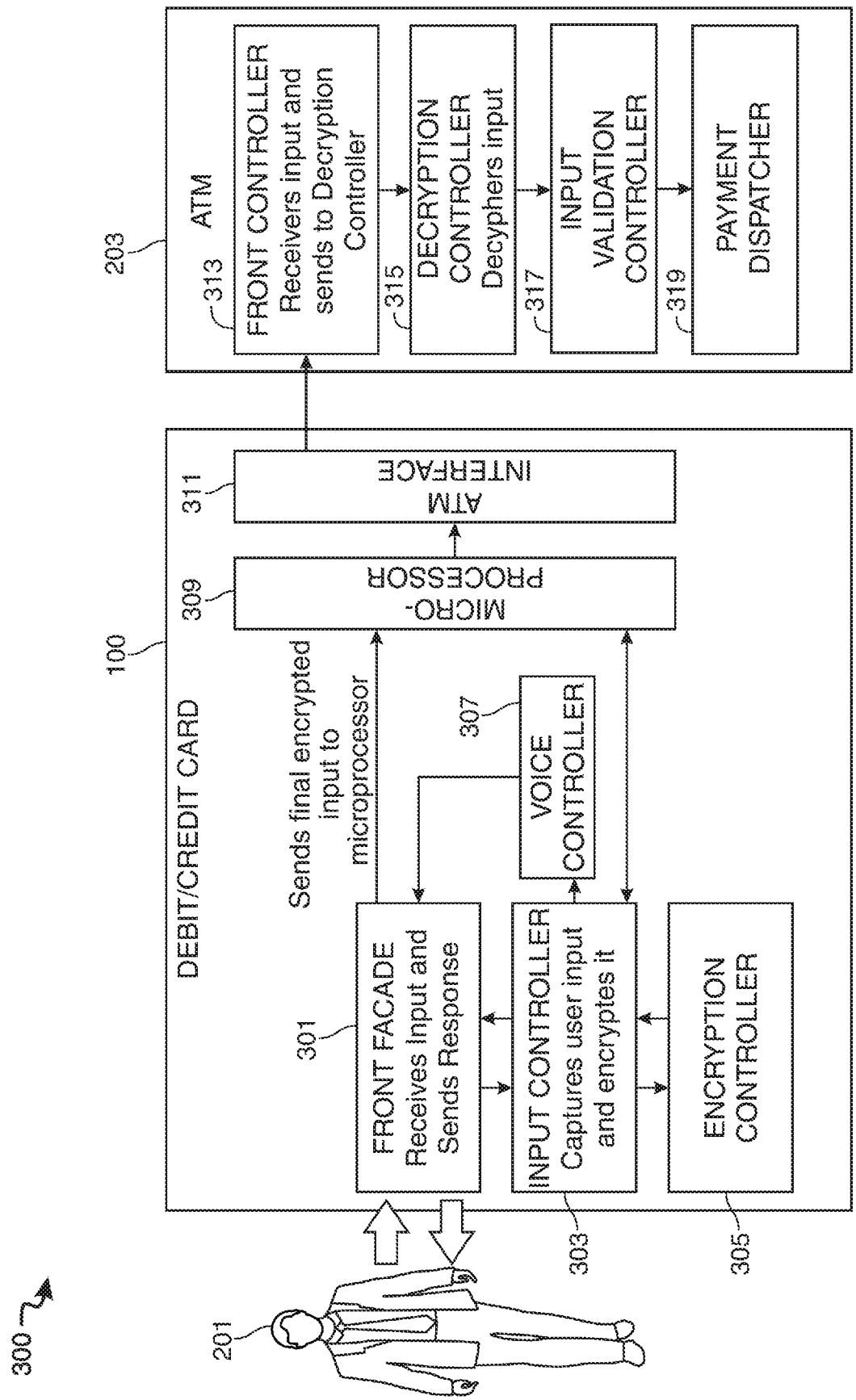
FIG. 3 shows illustrative apparatus in accordance with principles of the disclosure.

FIG. 3 shows illustrative components 300 of smart card 100 (shown in FIG. 1) and ATM 203 (shown in FIG. 2).

FIG. 3 shows that smart card 100 includes front facade 301. Front facade 301 may include keypad 105 and a speaker (not shown) for receiving input and providing output to user 203. The speaker may be controller by voice controller 307. Voice controller 307 may receive instructions from input controller 303.

Input controller 303 may capture data input by user 201 using keypad 105. Input controller 303 may encrypt the captured data. Input controller 303 may store captured data locally on smart card 100. Voice controller 307 may generate electrical impulses that when received by the speaker, audibly convey the data captured by input controller 303 to user 201.

Encryption of data captured by input controller 303 may be performed by encryption controller 305. Encryption controller 305 may encrypt the data using any suitable encryption algorithm. Illustrative encryption algorithms include RSA cryptography, Blowfish, AES, RC4, RC5, and RC6.

Smart card 100 may have limited power resources and may utilize an energy efficient encryption algorithm. An illustrative energy efficient encryption algorithm may include RC5, Skipjack and Secure IoT ("SIT").

SIT is a symmetric key algorithm that utilizes a 64-bit block cipher and requires 64-bit key to encrypt data. Typical symmetric key algorithms are designed to take an average of 10 to 20 encryption rounds to maintain a strong encryption process. Each encryption round utilizes mathematical functions to create confusion and diffusion. Generally, the more encryption rounds that are executed, the more secure the algorithm. However, the more encryption rounds that are executed also increase the amount of power consumed by the encryption algorithm.

To minimize power consumption, SIT is limited to just five encryption rounds and each encryption round includes mathematical operations that operate on 4 bits of data. To sufficiently secure the encrypted data, SIT utilizes a Feistel network of substitution diffusion functions such that encryption and decryption operations are very similar. The reduced number of encryption rounds is offset by the relatively long 64 bit key.

Microprocessor 309 may control overall operation of smart card 100 and its associated components. For example, microprocessor 307 may activate or deactivate keypad 105. When keypad 105 is active, input controller 303 may capture and encrypt data input using keypad 105. When keypad 105 is inactive, input controller 303 may not receive data from keypad 105. For example, in the inactive state, power may not be supplied to keypad 105.

In some embodiments, microcontroller may activate or deactivate input controller 303. When active, input controller 303 may capture and encrypt data input using keypad 105. When inactive, input controller 303 may disregard data input using keypad 105.

Microcontroller 309 may activate or deactivate any component of smart card 100. Based on detecting a communication channel associated with ATM 203, microprocessor may activate one or more components of smart card 100. Microprocessor 309 may activate or deactivate components of smart card 100 based on a location of smart card 100. For example, microprocessor 309 may only activate keypad 105 or input controller 303 when smart card 100 is in a familiar zone. User 201 may define a familiar zone by inputting a zip code into keypad 105. Microcontroller 309 may deactivate keypad 105 or input controller 303 when smart card 100 is in an unknown zone. Smart card 100 may include a GPS chip for detecting a current location.

Smart card 100 also includes ATM interface 311. ATM interface 311 may include a network interface or adapter. ATM interface 311 may include hardware and/or software for establishing a communication channel with ATM 203. The ATM interface may be configured to implement protocols for wireless and/or wired communication with ATM 203.

FIG. 3 also shows illustrative components of ATM 203. ATM 203 includes front controller 313. Front controller 313 communicates with smart card 100 via ATM interface 311.

Front controller 313 may include a network interface or adapter. Front controller 313 may include hardware and/or software for establishing a communication channel with smart card 100. Front controller 313 may be configured to implement protocols for wireless and/or wired communication with smart card 100.

Front controller 313 may receive transaction information and instructions transmitted stored on smart card 101 via ATM interface 311. Front controller 313 may establish a wired or contact based connection with smart card 101. For example, Front controller 313 may establish a wireless connection with smart card 101. For example, front controller 313 may include a NFC reader.

For example, front controller 313 may include a card reader for establishing a wireless connection with smart card 101. For example, front controller 313 may include circuitry for interacting with EMV chip 101 (shown in FIG. 1) of smart card 100. Front controller 313 may include one or more read heads. The read head(s) may include a plurality of sub-heads that are positioned to extract information encoded on EMV chip 101. The sub-heads may be positioned based on target chip locations as defined in ISO 7816, which is hereby incorporated herein by reference in its entirety.

ATM 203 includes decryption controller 315. Decryption controller 315 may decrypt transaction information/instructions received from smart card 101. The decrypted transaction information/instructions may be passed to input validation controller 317. Input validation controller 317 may connect to a remote computer server to validate authentication credentials or other information included in the transaction information/instructions received from smart card 100.

For example, input validation controller 317 may validate a PIN associated with user 203 and smart card 101. Input validation controller 317 may validate that an account associated with smart card 101 has an adequate balance to withdraw a requested amount included in the transaction information/instructions.

After input validation controller 317 validates the transaction information/instructions, input validation controller 317 may issue instructions to payment dispatcher 319. Payment dispatcher 319 may dispense the amount of cash requested by the transaction information/instructions (received from smart card 100) to user 201. ATM 203 does not require an input from user 201 after establishing communication with smart card 100 and receiving the transaction information/instructions stored on smart card 100.

Figure 4A:
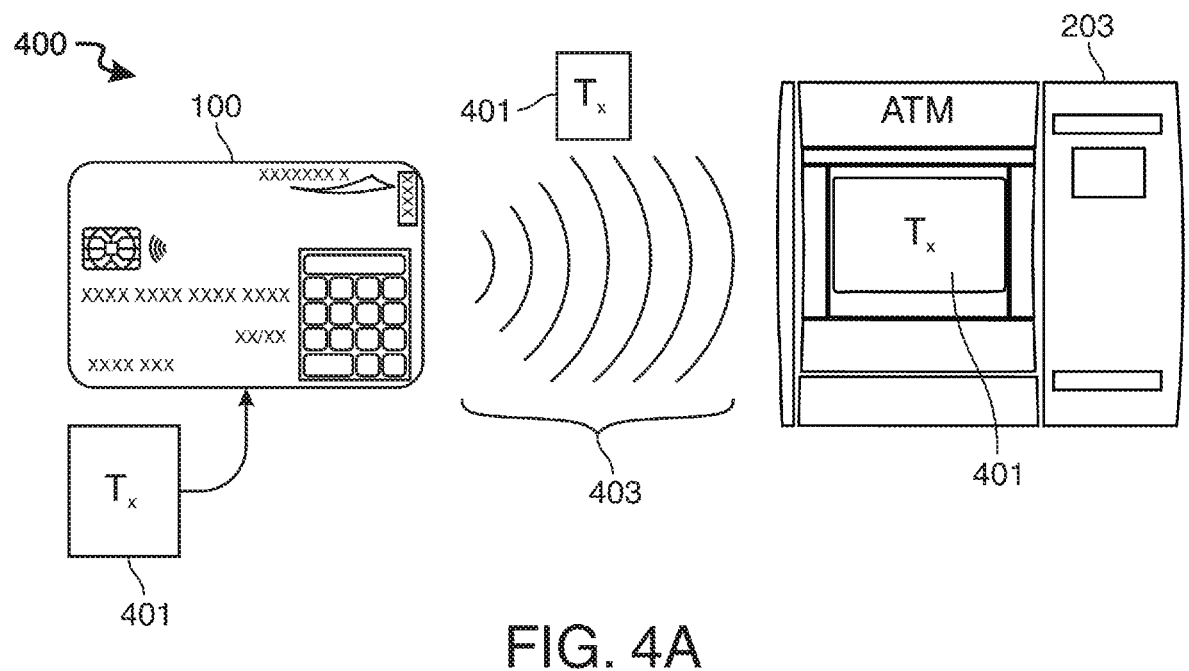
FIG. 4A shows an illustrative apparatus and scenario in accordance with principles of the disclosure.
Figure 4B:
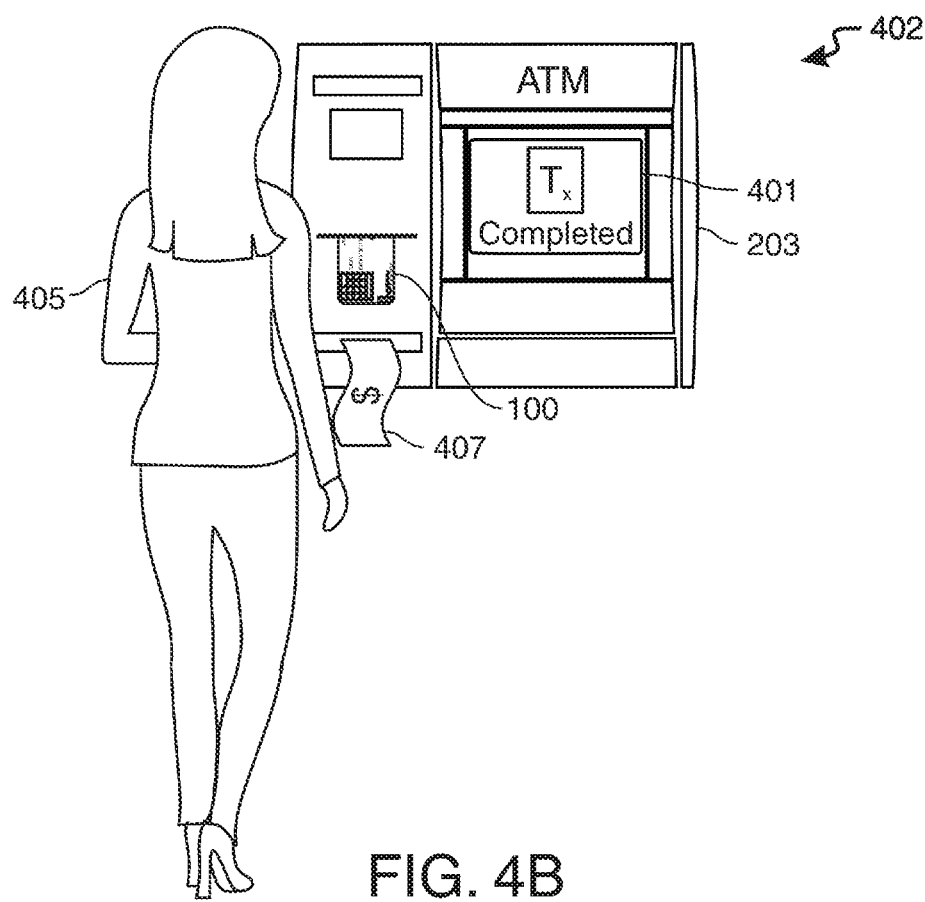
FIG. 4B shows an illustrative apparatus and scenario in accordance with principles of the disclosure.

FIGS. 4A-4B show illustrative scenarios 400 and 402. In scenario 400, user 405 has utilized keypad 105 of smart card 100 to enter transaction information that is stored locally on smart card 100. Smart card 100 may formulate transaction instructions that are executable by ATM 403. The transaction information entered by user 405 is stored on smart card 100 as transaction instructions 401.

Scenario 400 shows that smart card 100 and ATM 203 communicate using communication channel 403. Communication channel 403 may be established when smart card is within a threshold distance of ATM 203. For example, communication channel 403 may be an NFC channel established when smart card 100 and ATM 203 are within a close proximity of each other.

In other embodiments, communication channel 403 may be a Wi-Fi communication channel. For example, user 405 may enter the transaction information from a comfort of their home. User 405 may pass ATM 403 on the way to or home from work. Using a wireless network at home or work, user 405 may initiate a transfer of transaction instructions 401 to ATM 203.

Transaction instructions 401 are transferred over communication channel 403 to ATM 203. Scenario 400 shows that communication channel 403 is a wireless communication channel. In other embodiments, communication channel may be a wired or contact based communication channel.

FIG. 4B shows scenario 402. In scenario 402, user 405 has inserted smart card 100 into a card reader of ATM 203. As discussed above, user 405 may have transferred transaction instructions 401 specifically to ATM 203 because ATM 203 is at a convenient location.

Transaction instructions 401 may include timing restrictions. The timing restrictions may limit execution of transaction instructions 401 to a time window defined by the timing restrictions. If transaction instructions 401 are not executed within the time window, smart card 100 and/or ATM 203 may delete transaction instructions 401. If transaction instructions 401 are not executed within the time window, smart card 100 may delete transaction instructions 401.

In scenario 402, user 405 inserts smart card 100 into ATM 203. ATM 203 recognizes, based on the information stored on smart card 100, that transaction instructions 401 are associated with smart card 100. ATM 203 may recognize that transaction instructions 401 are associated with smart card 100 based on data encoded in an EMV chip or magnetic stripe of smart card 100. In some embodiments, when smart card 100 is inserted into ATM 203, smart card 100 may inform ATM 203 that transaction instructions 401 are ready to be executed by ATM 203.

Scenario 402 shows ATM 203 dispensing cash 407 to user 405. The amount of cash 407 is defined by transaction instructions 401. In scenario 402, ATM 203 dispenses cash 407 to user 405 without user 405 entering any data at ATM 203.

Figure 5A:
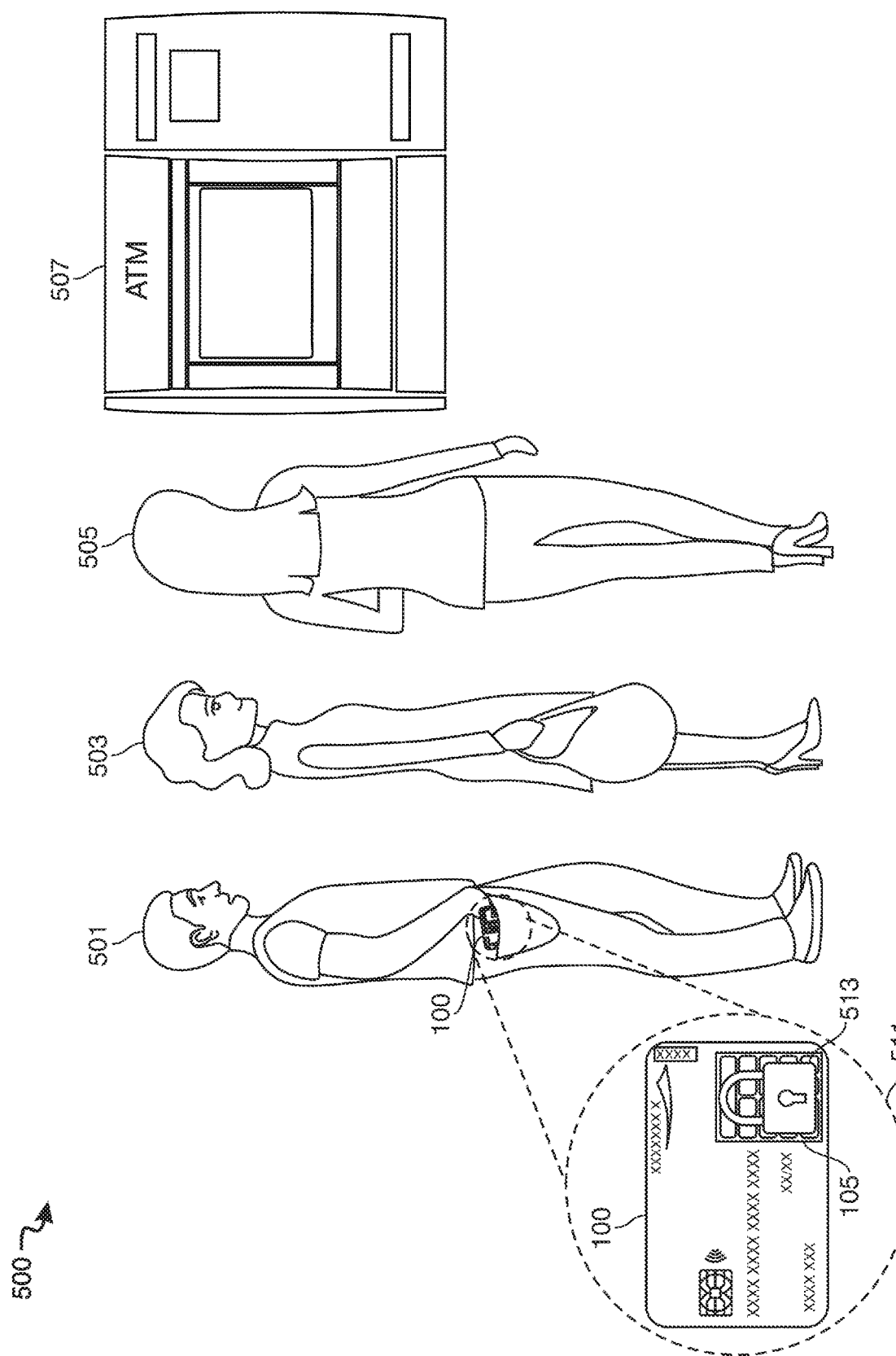
FIG. 5A shows an illustrative apparatus and scenario in accordance with principles of the disclosure.
Figure 5B:
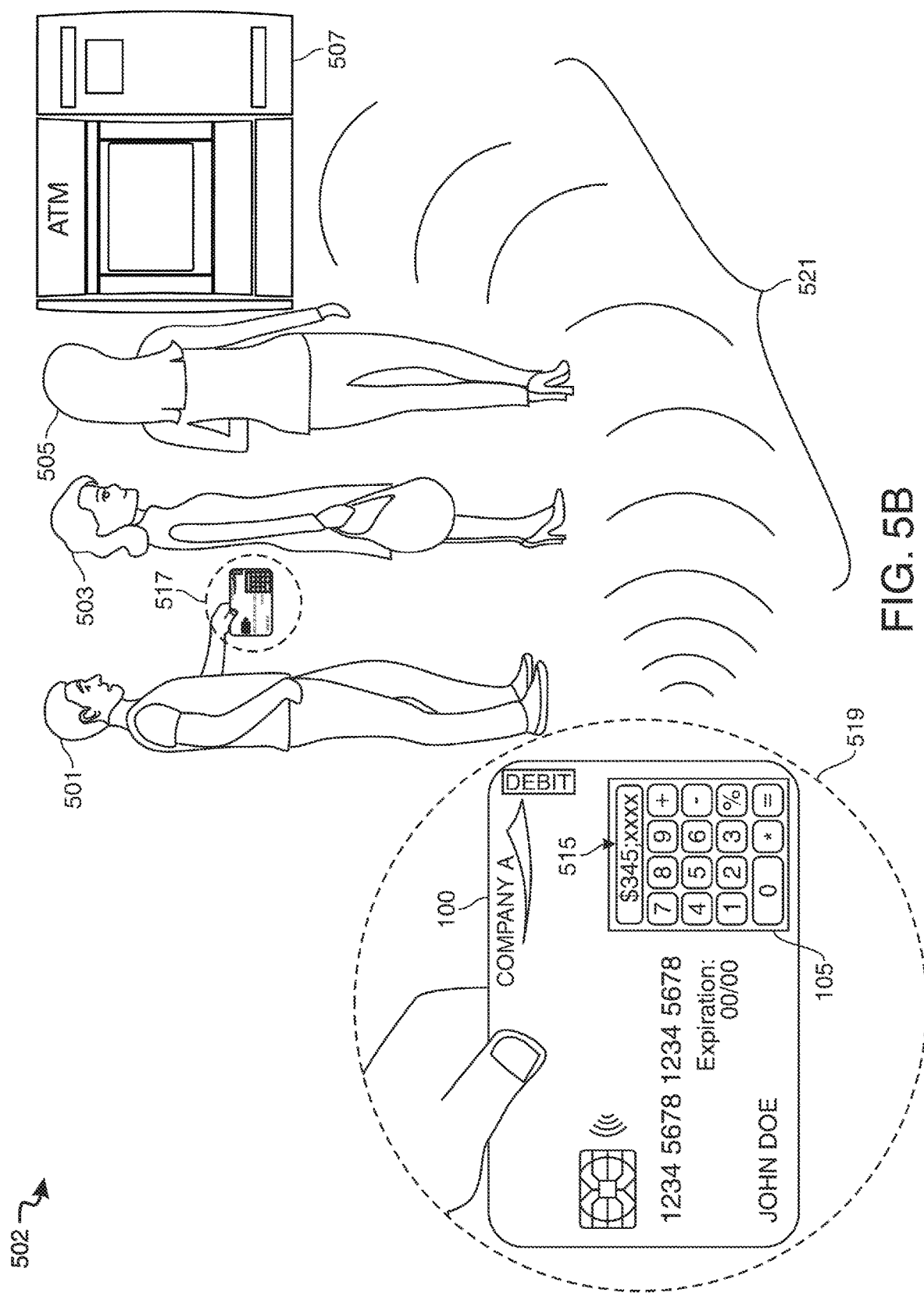
FIG. 5B shows an illustrative apparatus and scenario in accordance with principles of the disclosure.

FIGS. 5A and 5B show illustrative scenarios 500 and 502. FIG. 5A shows scenario 500. In scenario 500, users 501, 503 and 505 are all waiting on line to use ATM 507. Scenario 501 shows that user 501 is last on line. Scenario 500 also shows that user 501 is in possession of smart card 100.

Enlarged view 511 of smart card 100 shows that keypad 105 of smart card 100 is in an inactive state and is locked. When keypad 105 is inactive, information may not be entered using keypad 105. When keypad 105 is inactive, information entered using keypad 105 may not be stored on smart card 100. In some embodiments, keypad 105 may remain locked until smart card 100 detects that it is within range of a communication channel of ATM 507.

FIG. 5B shows scenario 502. In scenario 502, while user 501 is waiting on line, smart card 100 determines it is within range of a communication channel of ATM 507. Smart card 100 establishes to communication channel 521 with ATM 507. In response to establishing communication channel 521, microprocessor 309 (shown in FIG. 3) unlocks keypad 105. At shown in 517, user 501 may remove smart card 100 and enter transaction information while waiting for users 503 and 505 to complete their transactions at ATM 507.

Enlarged view 519 shows illustrative transaction information 515 entered by user 501 while waiting on line. Using unlocked keypad 105, user 501 has entered an amount —$345. Using unlocked keypad 105, user 501 has also entered a PIN. The PIN is represented by "xxxx" to prevent an onlooker from viewing the PIN entered by user 501.

Transaction information 515 may be transferred to ATM 507 while user 501 is waiting on line. When user 501 inserts smart card 100 into ATM 507, transaction information 515 previously entered by user 501 is used to execute a transaction at ATM 507. The transaction may be executed without requiring any inputs from user 501 after smart card 100 was inserted into ATM 507.

Executing transactions based on transaction information 515 previously entered by user 501 may increase a transaction efficiency of ATM 507. For example, each of users 503 and 505 may be in possession of a smart card such as smart card 100. Each of users 503 and 505 may enter transaction information using keypad 105 before approaching ATM 507.

Based on the previously entered transaction information, transactions desired by each of users 503 and 505 may be executed by ATM 507. The desired transactions may be executed without requiring any additional prompts or inputs from users 503 or 505 after their respective smart cards are inserted into ATM 507.

As a result of not having to prompt users 501, 503 or 505 for information, ATM 507 may process transactions desired by users 501, 503 or 505 in less time. Accordingly, users 501, 503 or 505 each wait less time on line before having their desired transactions executed by ATM 507.

Figure 6:
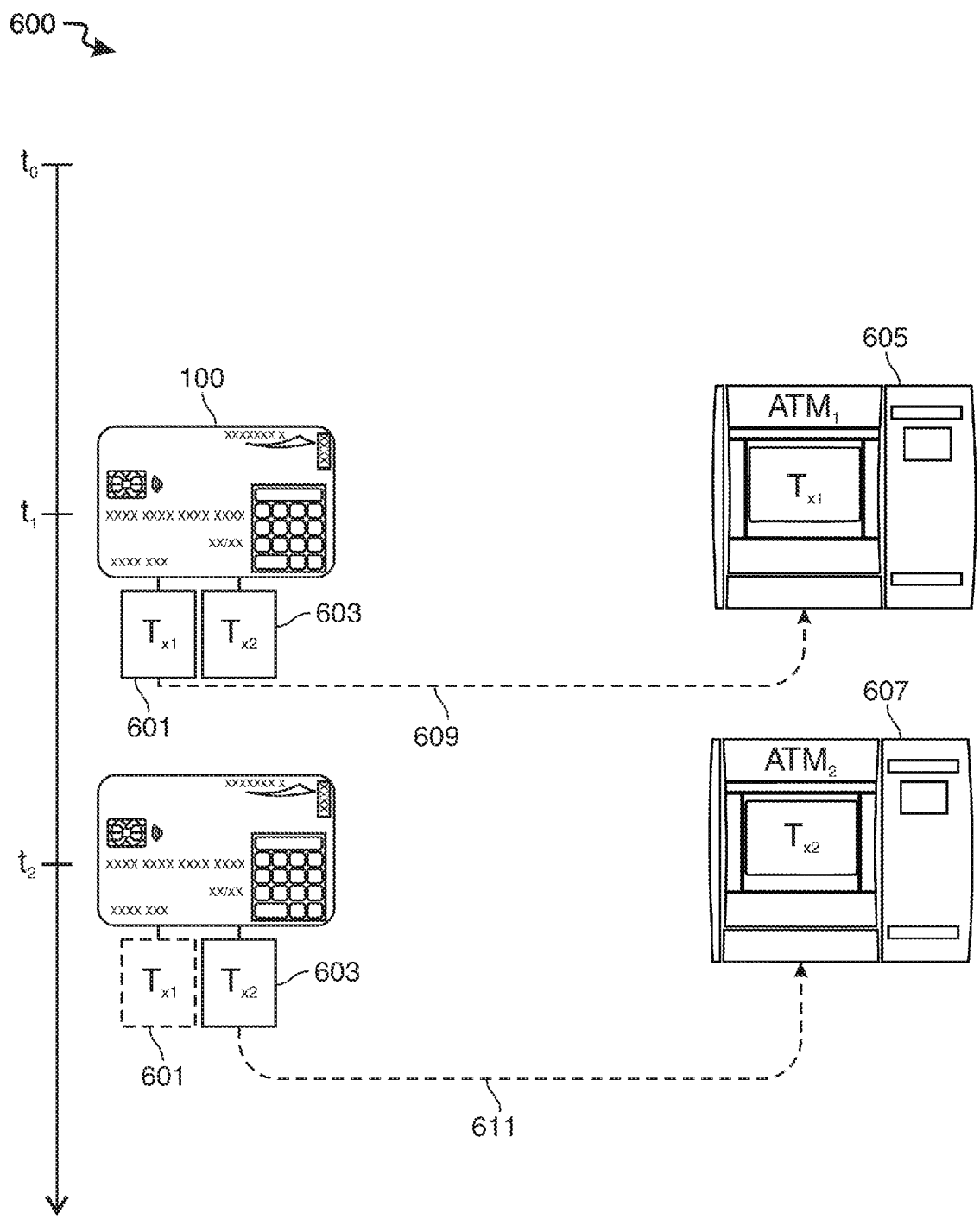
FIG. 6 shows an illustrative apparatus and scenario in accordance with principles of the disclosure.

FIG. 6 shows illustrative scenario 600. In scenario 600, at time $t_1$, smart card 100 locally stores two desired transactions—601 and 603. Each of transactions 601 and 603 may be associated with timing restrictions. Each of transactions 601 and 603 may be associated with location restrictions. For example, the user may limit transaction 601 to being executed at $t_1$ at ATM 605. The user may limit transaction 603 to being executed at $t_2$ at ATM 607.

Scenario 600 shows that at $t_1$, transaction 601 is transferred to ATM 605 via communication channel 609 for execution. Scenario 600 shows that at $t_2$, transaction 603 is transferred to ATM 607 via communication channel 611 for execution. At $t_2$, because transaction 601 has already been transferred to ATM 605 at $t_1$, transaction 601 is shown in phantom lines on smart card 100.

In some embodiments, transaction 601 may be deleted from smart card 100 after being transferred to ATM 605. For example, ATM 605 may issue an instruction to smart card 100 to delete transaction 601 after ATM 605 successfully executes transaction 601.

Thus, methods and apparatus for CARD PRE-STAGING ATM TECHNOLOGY are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for improving transaction processing efficiency of an Automated Teller Machine ("ATM"), the system comprising a smart card having a thickness not greater than 0.8 millimeters ("mm") and a surface area not greater than 86 mm×54 mm and comprising:
   an ATM interface;
   a microprocessor;
   a user input system in electronic communication with the microprocessor, the user input system comprising:
      a keypad;
      an input controller that captures data entered using the keypad;
      a voice controller that generates an audio message confirming the data captured by the input controller; and
      an encryption controller that encrypts the data captured by the input controller, thereby producing encrypted data; and
   executable instructions stored in a non-transitory memory, that when run by the microprocessor:
      self-authenticate the smart card over an ATM communication channel and establish a secure communication link with the ATM using the ATM interface; and
      stage a transaction at the ATM based on the encrypted data, thereby improving the transaction processing efficiency of the ATM.

2. The system of claim 1, wherein the keypad comprises mechanical keys.

3. The system of claim 1, wherein:
   the transaction is a first transaction;
   the ATM is a first ATM; and
   the executable instructions stored in the non-transitory memory, when run by the microprocessor, are configured to:
      store the first transaction and a second transaction locally on the smart card;
      stage the first transaction at the first ATM; and
      stage the second transaction at a second ATM after the first transaction is executed by the first ATM.

4. The system of claim 1, wherein the executable instructions stored in the non-transitory memory, when run by the microprocessor, configure the ATM to purge the staged transaction when the ATM does not establish a contact-based communication channel with the smart card within a pre-determined time period.

5. The system of claim 1, wherein the ATM comprises:
   a front controller that receives the encrypted input data from the ATM interface over the ATM communication channel;
   a decryption controller that decrypts the encrypted data;
   an input validation controller that communicates with a remote computer server and validates the encrypted data; and
   a payment dispatcher that dispenses cash in response to a positive validation received from the input validation controller.

6. The system of claim 1, wherein:
   the smart card further comprises a wireless communication circuit; and
   the executable instructions stored in the non-transitory memory, when run by the microprocessor:
      scan for a wireless ATM communication channel; and
      in response to detecting the wireless ATM communication channel:
         transfer the encrypted data to the ATM over the wireless ATM communication channel;
         stage the transaction at the ATM; and
         execute the staged transaction after establishing contact-based communication with the ATM.

7. The system of claim 6, wherein the executable instructions stored in the non-transitory memory, when run by the microprocessor, purge the encrypted data from the smart card when the ATM does not establish contact-based communication with the smart card within a pre-determined time period.

8. A method of improving transaction processing efficiency of an Automated Teller Machine ("ATM"), the method comprising:
   capturing transaction information using a keypad embedded in a smart card;
   encrypting the transaction information, thereby producing encrypted transaction information;
   storing the encrypted transaction information locally on the smart card;
   transferring the encrypted transaction information from the smart card to the ATM;
   formulating a staged transaction based on the encrypted transaction information;
   executing the staged transaction without receiving any input from a user of the smart card after transferring the encrypted transaction information from the smart card to the ATM; and
   providing audio confirmation to the user of the encrypted transaction information stored locally on the smart card.

9. The method of claim 8, further comprising transferring the encrypted transaction information from the smart card to the ATM using a contact-based communication channel.

10. The method of claim 8, further comprising transferring the encrypted transaction information from the smart card to the ATM using a wireless communication channel.

* * * * *